(12) United States Patent
Bergeron et al.

(10) Patent No.: US 9,134,414 B2
(45) Date of Patent: Sep. 15, 2015

(54) METHOD AND APPARATUS FOR DETERMINING A DOPPLER CENTROID IN A SYNTHETIC APERTURE IMAGING SYSTEM

(75) Inventors: Alain Bergeron, Chemin Saint-Louis (CA); Linda Marchese, Côte de Cap-Rouge (CA)

(73) Assignee: INSTITUT NATIONAL D'OPTIQUE, Quebec (CA)

( * ) Notice: Subject to any disclaimer, the term of this patent is extended or adjusted under 35 U.S.C. 154(b) by 924 days.

(21) Appl. No.: 12/933,010

(22) PCT Filed: Jun. 28, 2010

(86) PCT No.: PCT/CA2010/001010
§ 371 (c)(1),
(2), (4) Date: Jan. 5, 2012

(87) PCT Pub. No.: WO2012/000076
PCT Pub. Date: Jan. 5, 2012

(65) Prior Publication Data
US 2012/0119943 A1    May 17, 2012

(51) Int. Cl.
*G01S 13/90*    (2006.01)
(52) U.S. Cl.
CPC ......... *G01S 13/9005* (2013.01); *G01S 13/9035* (2013.01)
(58) Field of Classification Search
CPC .................. G01S 13/9005; G01S 13/9035
USPC ......... 342/42–51, 148, 54, 88, 99, 25 A, 179, 342/191
See application file for complete search history.

(56) References Cited

U.S. PATENT DOCUMENTS

| 7,728,757 B2 | 6/2010 | Cho |
| 2008/0084551 A1 | 4/2008 | Harnisch |
| 2010/0109938 A1 | 5/2010 | Oswald et al. |

FOREIGN PATENT DOCUMENTS

| CA | 2691788 | 1/2009 |
| WO | 2006/072813 | 7/2006 |

OTHER PUBLICATIONS

McCandless, Samuel. Principles of Syntehtic Aperature Radar. Washington DC: US Department of Commerce, 2004. Accessed Dec. 18, 2014. http://web.archive.org/web/20060627215046/http://www.sarusersmanual.com/ManualPDF/NOAASARManual_CH01_pg001-024.pdf.*

(Continued)

*Primary Examiner* — Timothy A Brainard
(74) *Attorney, Agent, or Firm* — Norton Rose Fulbright Canada LLP; Alexandre Daoust (57) ABSTRACT

There is described a method for determining a Doppler centroid in a synthetic aperture imaging system, comprising: receiving raw data representative of electromagnetic signals reflected by a target area; selecting, among the raw data, at least two sets of sub-area data each representative of electromagnetic signals reflected by a corresponding sub-area of the target area, the sub-areas being substantially aligned along an azimuth axis of the target area and having a substantially identical surface area; for each one of the sets of sub-area data, generating an image corresponding to the corresponding sub-area; and measuring a mean intensity of the image; and estimating the Doppler centroid from a skew of an intensity function representing the mean intensity as a function of a look number for the corresponding sub-area.

10 Claims, 9 Drawing Sheets

(56) References Cited

OTHER PUBLICATIONS

M. Y. Jin, "Optimal range and Doppler centroid estimation for a ScanSAR system," IEEE Trans. Geosci. Remote Sensing, vol. 34, pp. 479-488, Mar. 1996. Accessed Dec. 18, 2014. http://ieeexplore.ieee.org/stamp/stamp.jsp?tp=&arnumber=1304880.*

M. Y. Jin, "Optimal Coppler Centroid Estimation for SAR Data from a Quasi-Homogeneous Source," IEEE Trans. Geosci. Remote Sensing, vol. GE-34, pp. 1022-1025, Nov. 1986. Accessed Dec. 18, 2014. http://ieeexplore.ieee.org/xpls/abs_all.jsp?arnumber=4072577.*

Elachi, C.; Bicknell, T.; Jordan, R.L.; Chialin Wu, "Spaceborne synthetic-aperture imaging radars: Applications, techniques, and technology," Proceedings of the IEEE , vol. 70, No. 10, pp. 1174,1209, Oct. 1982. Accessed Dec. 18, 2014. URL: http://ieeexplore.ieee.org/stamp/stamp.jsp?tp=&arnumber=1456716&isnumber=31318.*

M.Y. Jin, "Optimal Doppler centroid estimation for SAR DATA from a quasi-homogeneous source", Nov. 1986, IEEE Geoscience and Remote sensing society, Issue-6, pp. 1022-1025.*

Kong et al. "Ambiguity-Free Doppler Centroid Estimation Technique for Airborne SAR Using the Radon Transform", IEEE Transactions on Geoscience and remote sensing, vol. 43, No. 4, Apr. 2005, pp. 715-721.

Xie et al., "A Doppler Parameters Estimation Technique for Squint SAR Imaging", IEEE, 2008, pp. 402-406.

Marchese et al., "A real-time high-resolution optical SAR processor", Proceeding of SPIE, vol. 7669, 2010, pp. 1-7.

Marchese et al., "Full scene SAR processing in seconds using a reconfigurable optronic processor", IEEE, 2010, pp. 1362-1364.

Orsomando et al., "SAR and Optical Data Fusion for Change Detection", Urban Remote Sensing Joint Event, IEEE, 2007.

International Search Report dated Mar. 16, 2011 issued by the International Bureau (WIPO) in connection with the corresponding International patent application No. PCT/CA2010/001010.

Graham L. C., "Synthetic Interferometer Radar for Topographic Mapping", Proceedings of IEEE 62, No. 2, Jun. 1974, pp. 763-768.

Ouchi et al., "Cross-Track Proposed Multi-Frequency SAR Interferometry: Comparisons with Optical Holographic Interferometry", IEEE, vol. 4, Issue 8, Aug. 1994, pp. 2263-2266.

Leith, Emmet N., "Quasi-Holographic Techniques in the Microwave Region", Proceedings of the IEEE, vol. 59, No. 9, Sep. 1971, pp. 1305-1323.

Kozma et al., "Tilted-plane optical processor", Applied Optics, vol. 11, No. 8, Aug. 1972, pp. 1766-1777.

Leith E. N., "Range-azimuth-coupling aberrations in pulse-scanned imaging systems", Journal of the Optical Society of Americas, vol. 63, No. 2, Feb. 1973, pp. 119-126.

Hecht E. , "Optics", Addison-Wesley, Co. 1987, pp. 593-610.

Olmsted, Coert, "Alaska SAR Facility Scientific Sar User's Guide", Jul. 1993, pp. 1-53.

* cited by examiner

METHOD AND APPARATUS FOR DETERMINING A DOPPLER CENTROID IN A SYNTHETIC APERTURE IMAGING SYSTEM

CROSS-REFERENCE TO RELATED APPLICATIONS/PRIORITY CLAIM

This application is a national phase of PCT patent application serial number PCT/CA2010/001010 filed Jun. 28, 2010, designating the United States of America, now pending, the specification of which is hereby incorporated by reference.

TECHNICAL FIELD

The present invention relates to the field of synthetic aperture imaging systems, and more particularly to synthetic aperture raw data processing methods and apparatus.

BACKGROUND

Synthetic aperture radar (SAR) imaging systems are widely used in aerial and space reconnaissance. Usually, an aircraft or a spacecraft is provided with a SAR imaging system which transmits radar pulses and collects radar echoes corresponding to the radar pulses reflected by an object to be imaged.

In SAR imaging systems, estimating the Doppler centroid frequency may be required for compensating for variations in the antenna beam since a Doppler frequency shift may degrade the quality of the radar image. Methods have been developed for estimating the Doppler centroid. However, these methods require the use of additional operations in the Fourier domain. Furthermore, these methods require Fourier transforms of the SAR raw data, which are processing power consuming.

Therefore there is a need for an improved method and apparatus for determining a Doppler centroid in a SAR imaging system.

SUMMARY

In accordance with a first broad aspect, there is provided a method for determining a Doppler centroid in a synthetic aperture imaging system, comprising: receiving raw data representative of electromagnetic signals reflected by a target area; selecting, among the raw data, at least two sets of sub-area data each representative of electromagnetic signals reflected by a corresponding sub-area of the target area, the sub-areas being substantially aligned along an azimuth axis of the target area and having a substantially identical surface area; for each one of the sets of sub-area data, generating an image corresponding to the corresponding sub-area; and measuring a mean intensity of the image; and estimating the Doppler centroid from a skew of an intensity function representing the mean intensity as a function of a look number for the corresponding sub-area.

In accordance with a second broad aspect, there is provided a system for determining a Doppler centroid associated with synthetic aperture data, comprising: a memory for storing raw data representative of electromagnetic signals reflected by a target area; a sub-image data generator adapted to select, among the raw data, at least two sets of sub-area data each representative of the electromagnetic signals reflected by a corresponding sub-area of the target area, the sub-areas being substantially aligned along an azimuth axis of the target area and having a substantially identical surface area; an image generator adapted to, for each one of the sets of sub-area data, generate an image corresponding to the corresponding sub-area and measure an intensity of the image; and a Doppler centroid estimator adapted to calculate the Doppler centroid from a skew of an intensity function representing the mean intensity as a function of a look number for the corresponding sub-area.

DESCRIPTION

Figure 1:
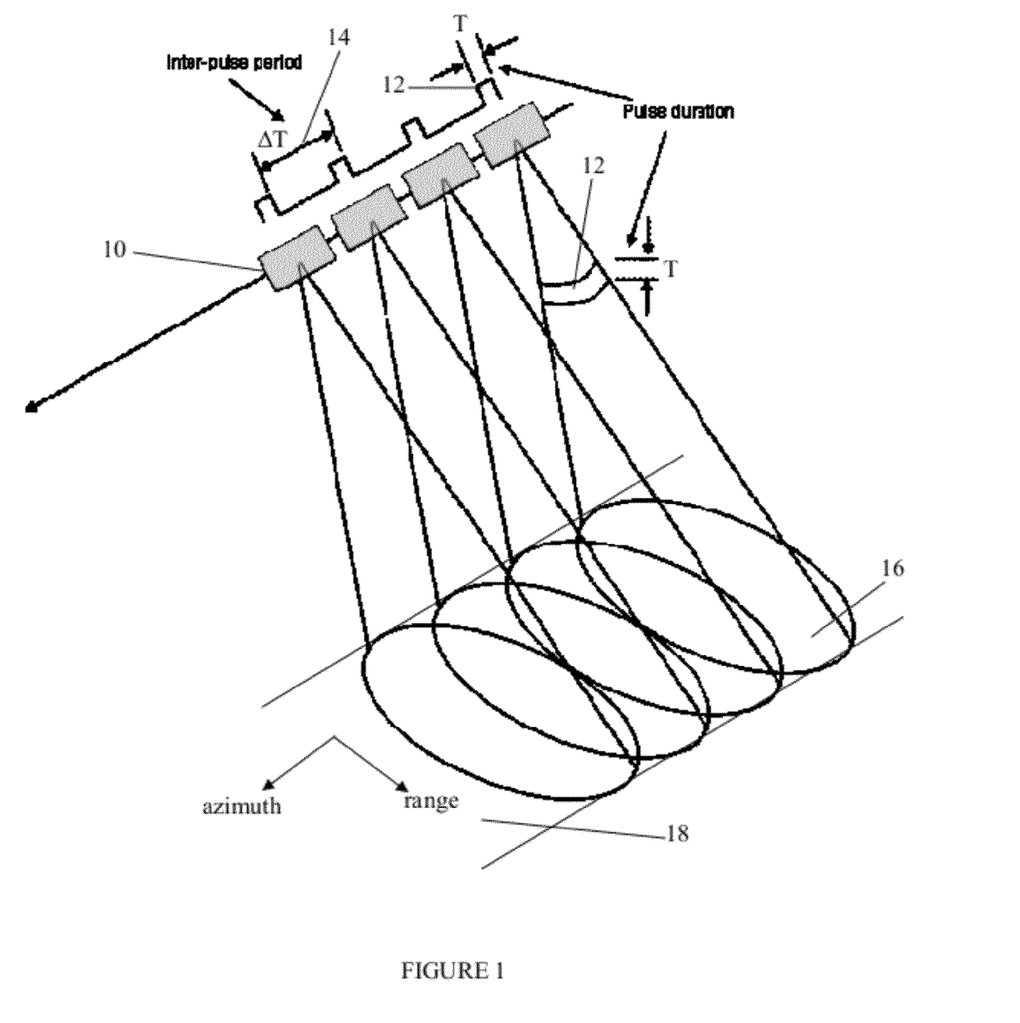
FIG. 1 illustrates a SAR imaging system for imaging a target area, in accordance with an embodiment.

FIG. 1 illustrates one embodiment of a satellite 10 provided with a SAR imaging system. The satellite 10 is in orbit around an object to be imaged, such as a planet for example. The satellite 10 is traveling along a satellite flight path while imaging the planet. The SAR imaging system is adapted to emit successive electromagnetic radar pulses 12 in direction of the planet. Each radar pulse 12 is characterized by a pulse duration T and two successive radar pulses 12 are temporally spaced apart by an inter-pulse duration ΔT. The pulse duration T and the inter-pulse duration ΔT defines a pulse repetition frequency which corresponds to the repetition rate of the outgoing radar pulses 12. The emitted radar pulses 12 form a radar beam 14 which illuminates the target area to be imaged. The area of the planet ground which intersects the radar beam is referred to as the footprint 16 of the radar beam. While FIG. 1 illustrates an oval footprint 16, it should be understood that the footprint 16 may have other shape. For example, the footprint 16 may be round. While the satellite 10 is moving along the satellite flight path, the footprint 16 is moving, thereby defining a swath 18. The swath 18 is characterized by a length in an azimuth direction and a width in a range direction. The azimuth direction corresponds to the propagation direction of the radar beam 14, i.e. the flight path direction, and the range direction is the direction normal to the azimuth direction. When reaching the ground, the radar pulses 12 are reflected to give rise to radar echoes. The radar echoes are collected by the SAR system and processed in order to generate a radar image of the target area.

The SAR system mounted to the satellite 10 is provided with at least one emitting antenna for emitting the pulses 12. The emitting antenna can be used for detecting the radar echoes reflected by the ground. Alternatively, at least one receiving antenna different from the emitting antenna can be used for collecting the radar echoes.

A SAR image is generated by superposing a plurality of radar echoes within the range and azimuth of the SAR antenna footprint 16. The received echoes are converted into electrical signals which are referred to as SAR raw data.

Alternatively, the electrical signals may be subsequently converted into digital data, which are also referred to as the SAR raw data. The SAR raw data is then processed to create the SAR image of the illuminated target area. A high resolution in the azimuth direction is achieved by applying SAR signal processing without requiring large antennas. The SAR signal processing allows synthesizing a large aperture antenna. SAR signal processing can be mathematically described as a correlation or a filtering process on all of the radar echoes received during an aperture time.

During operation of a SAR detection system, at least one of the parameters of the SAR detection system may vary. In order to generate an adequate image, a compensation for the parameter variation is usually performed. In some instances, the change of the SAR parameter may cause a Doppler shift. The Doppler shift refers to a shift of the Doppler centroid which is the center Doppler frequency of the Doppler spectrum as the radar beam sweeps past the target area. Examples of a parameter of which a variation causes a Doppler shift comprise the squint angle which corresponds to the angle between the radar beam center and the normal to the flight path, a change of the eccentricity of the platform orbit, and the like.

Figure 2:
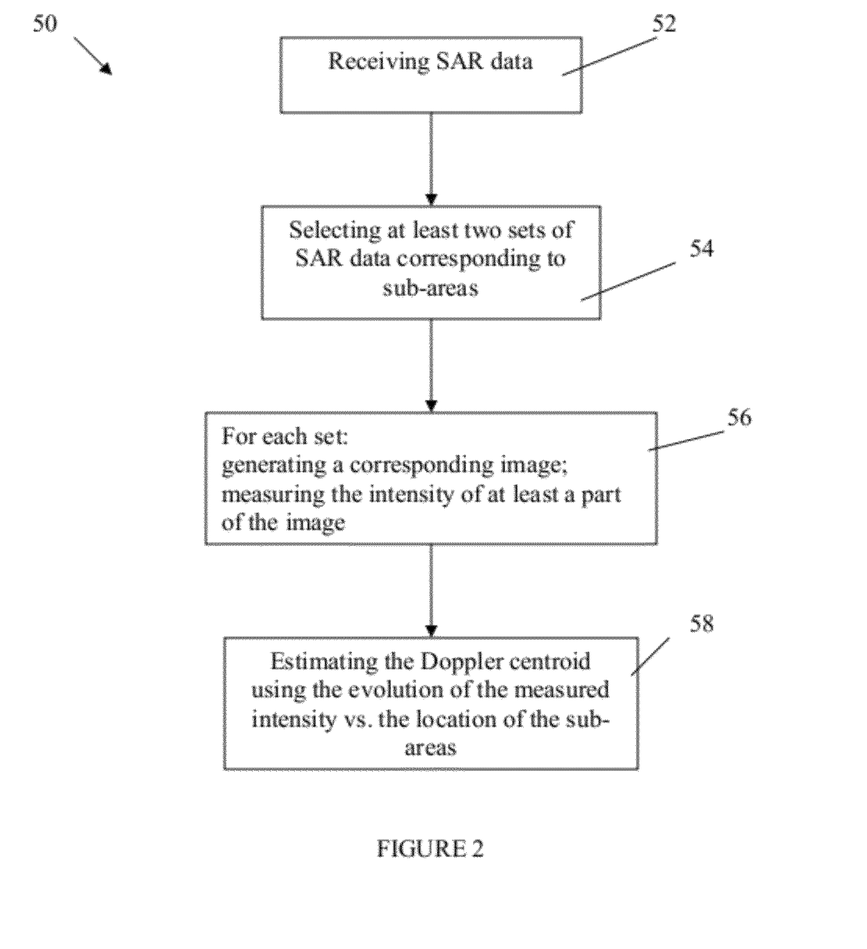
FIG. 2 is a flow chart illustrating a method for estimating a Doppler centroid, in accordance with an embodiment.

FIG. 2 illustrates one embodiment of a method 50 for determining a Doppler centroid. The first step 52 comprises receiving SAR raw data from a SAR imaging system. The SAR raw data is representative of electromagnetic radar echoes reflected by a target area. The second step 54 comprises selecting, amongst the SAR raw data, at least two sub-sets of data each representative of the echoes reflected by a corresponding sub-area of the target area. The sub-areas are selected such that they have substantially the same surface area and they are aligned along a line parallel to the azimuth axis of the target area.

In one embodiment, the sub-areas are chosen to be substantially symmetric about the antenna beam center.

Figure 3A:
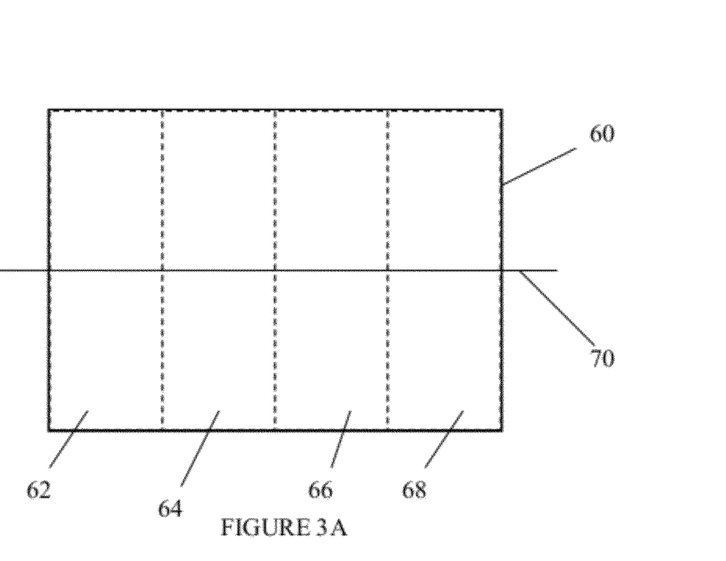
FIGS. 3A and 3B illustrate a target area to be imaged divided into four sub-areas and five areas, respectively.

FIG. 3A illustrates a target area 60 divided into four adjacent sub-areas 62, 64, 66, and 68 resulting from an even division of the target area 60. The sub-areas 62, 64, 66, and 68 have the same surface area and extend along the whole width of the target area 60 in the range direction. The sub-areas 62, 64, 66, and 68 are centered on an azimuth line 70 which passes through the center of the target area 60. While FIG. 3A illustrates contiguous sub-areas 62, 64, 66, and 68 which extend along the entire width of the target area 60, the division of the target area 60 may be performed such that the sub-areas are spaced apart along the azimuth line 70 and/or they extend along only a section of the width of the target area 60.

Figure 3B:
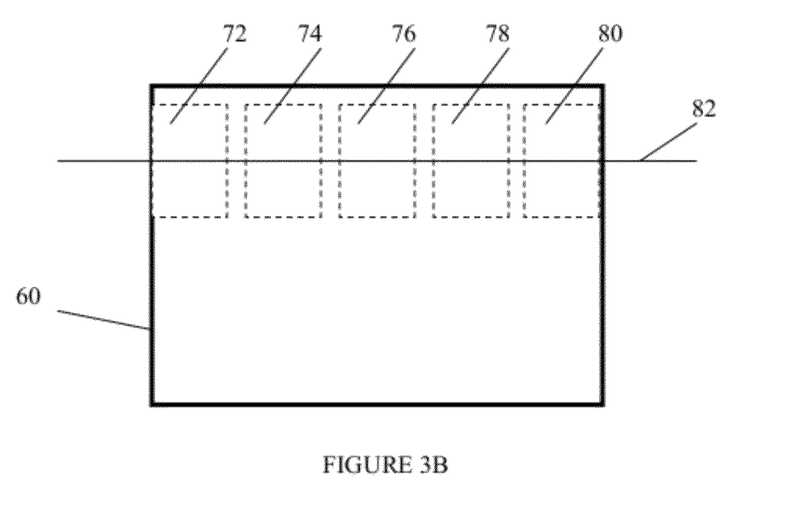
Figure 4A:
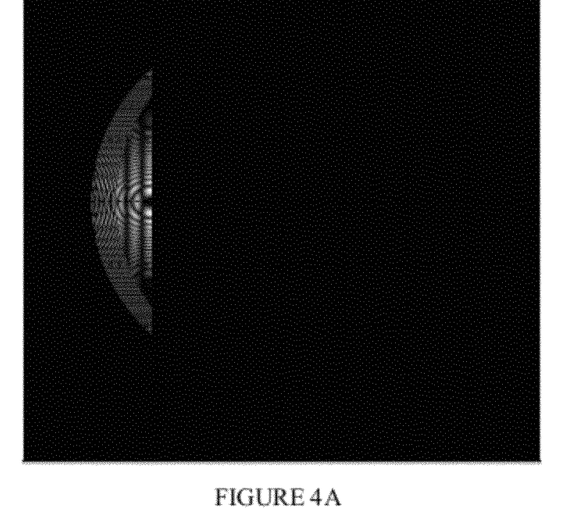
FIGS. 4A-4D illustrate graphical representations of SAR raw data corresponding to four sub-areas of a target area to be imaged, in accordance with an embodiment.
Figure 4B:
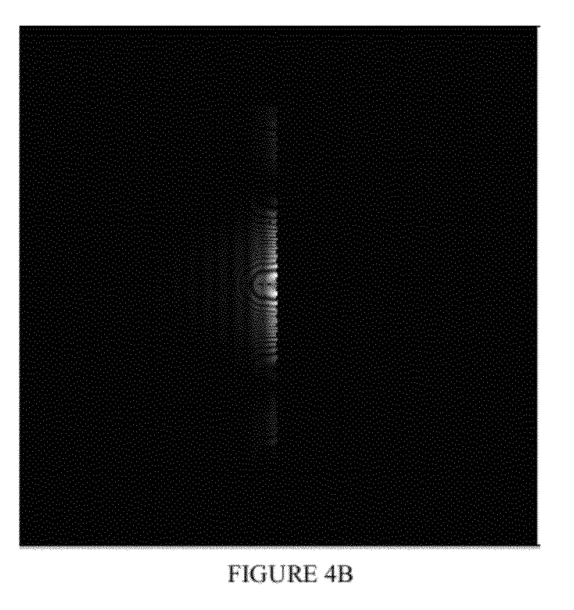
Figure 4C:
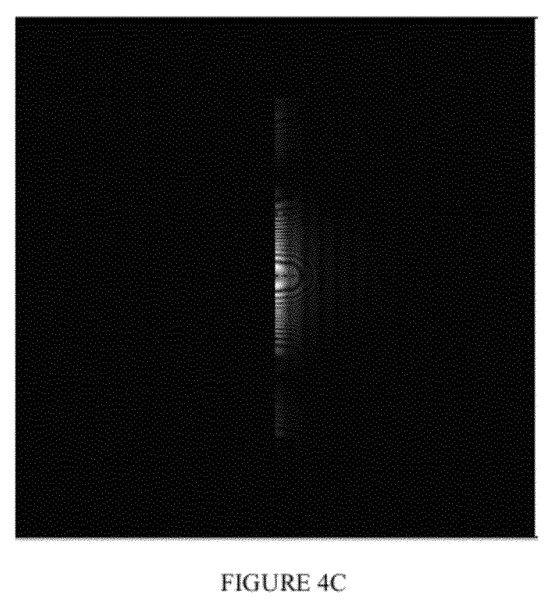
Figure 4D:
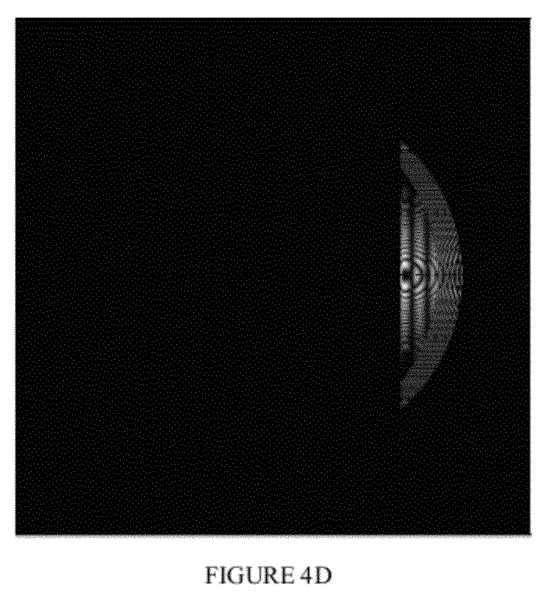
Figure 5A:
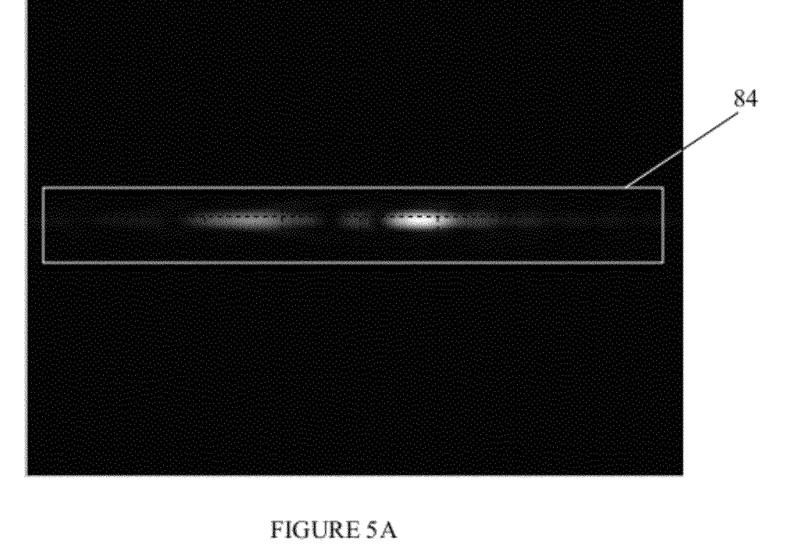
FIGS. 5A-5D illustrate the SAR images corresponding to the SAR raw data of FIGS. 4A-4D, respectively.
Figure 5B:
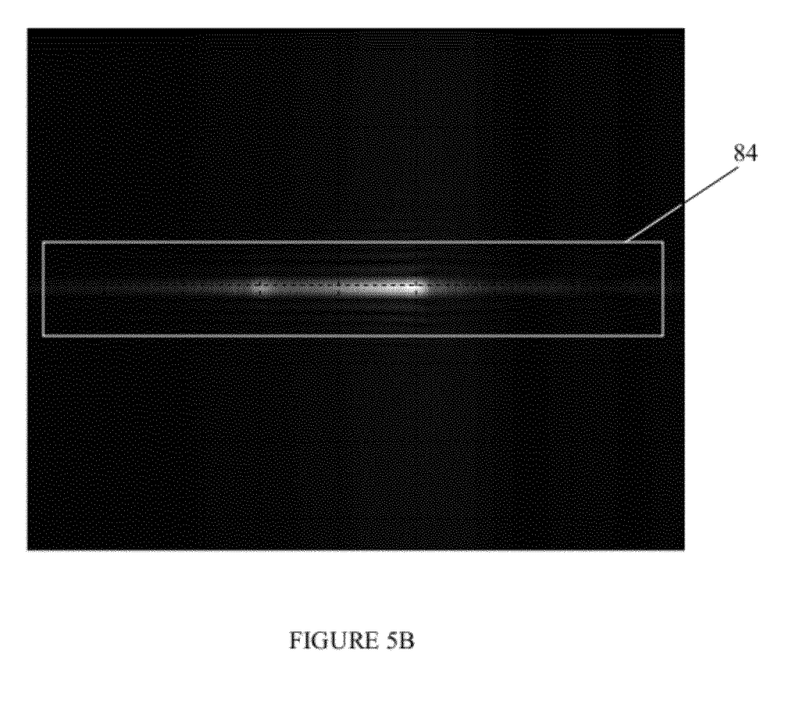
Figure 5C:
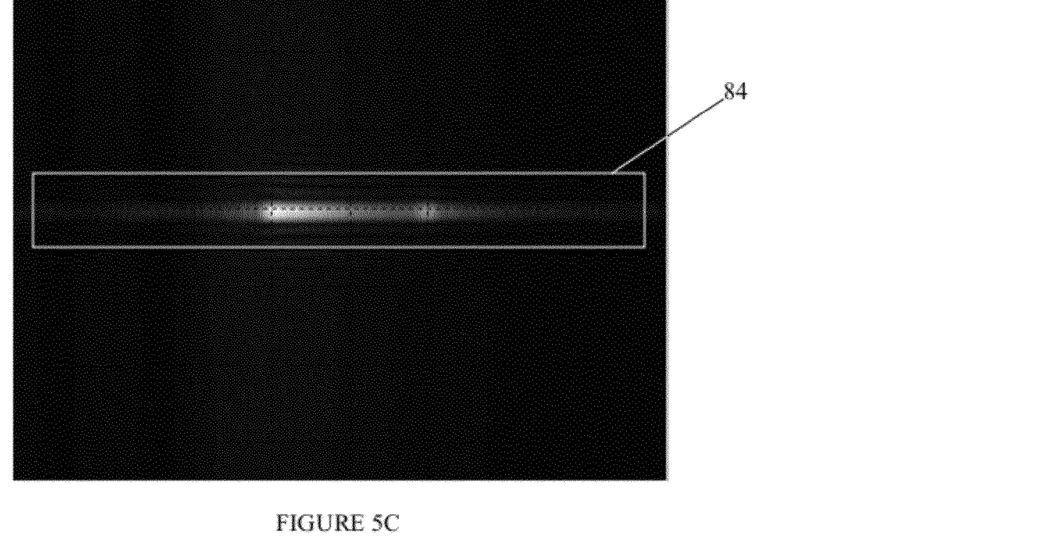
Figure 5D:
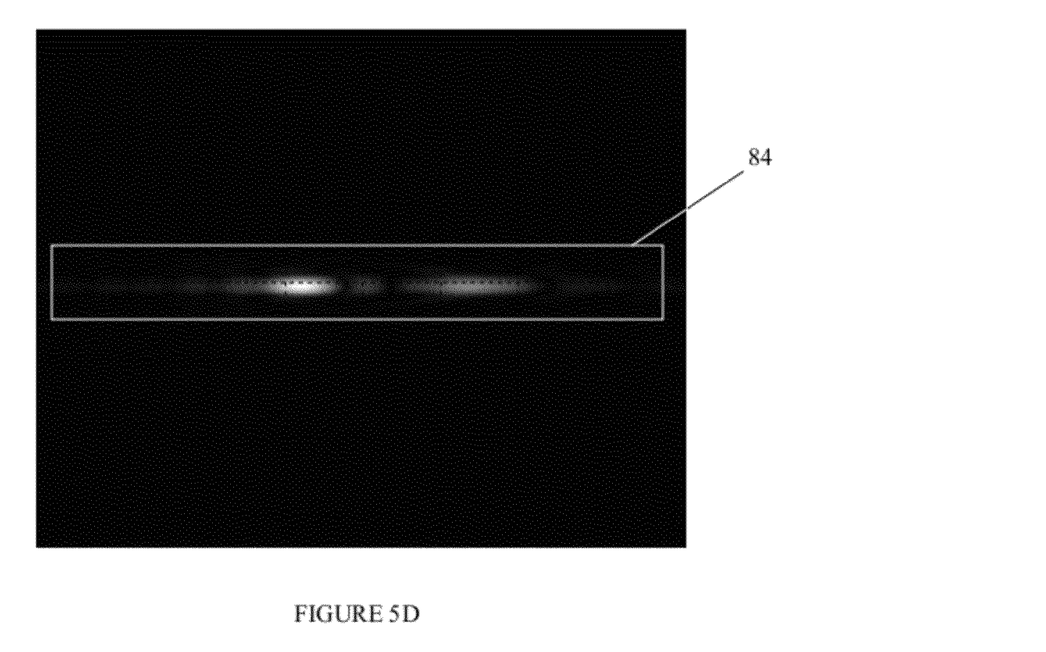

FIG. 3B illustrates another selection of sub-areas within the target area 60. Five sub-areas 72, 74, 76, 78, and 80 are selected from the target area 60. The five sub-areas 72, 74, 76, 78, and 80 have the same surface area and are discontinuously aligned along an azimuth line 82 which is parallel to the azimuth axis and does not pass through the center of the target area 60.

Referring back to FIG. 2, the next step 56 of the method 50 comprises the generation of a SAR image for each one of the sub-sets of SAR raw data and the measurement of the mean intensity of each generated SAR image. Each generated SAR image is an image of its corresponding sub-area. Any adequate method for generating a SAR image from SAR raw data can be used.

In one embodiment, the step 56 of generating the SAR image comprises digitally generating the SAR image using the SAR raw data. Any adequate digital method for generating a SAR image using SAR raw data can be used. Examples of adequate digital methods comprise the range/Doppler method, the wavenumber method, the chirp-scaling method, the plane-wave approximation method, and the like.

In another embodiment, the step 56 of generating the SAR image using the SAR raw data comprises optically generating the SAR image using the SAR raw data. Any adequate optical methods for generating a SAR image using the SAR raw data can be used. The SAR image is generated by creating an optical image of the SAR raw data and optically processing the image of the SAR raw data.

In one embodiment, the optical image of the SAR raw data is created using a light modulator such as a spatial light modulator (SLM) or a micro display. The light modulator comprises addressable pixels organized in rows along a first axis representing the azimuth and in columns along a second axis representing the range. The transmittance of each pixel of the light modulator is controlled in accordance with the amplitude and/or phase of the corresponding SAR data value. A coherent light such as a laser light is generated and illuminates the light modulator. The incident laser light is modulated by the light modulator and an optical image of the SAR data is generated at the output of the light modulator. The optical image of the SAR data is then optically processed to reconstruct the SAR image of the sub-area. The reconstructed SAR image can be projected on a screen. Alternatively, an optical sensor such as a charge-coupled device (CCD) or a complementary metal-oxide-semiconductor (CMOS) sensor, for example, can be used to convert the optical SAR image of the target area into a digital SAR image of the target area which can be recorded in a memory or sent to a base station, for example.

In one embodiment, the SLM comprises two SLMs mapped one onto the other. The transmittance of the pixels of the first SLM is set in accordance with the amplitude of the SAR raw data points and the transmittance of the pixels of the second SLM is set in accordance with the phase of the SAR raw data points, or vice versa.

In one embodiment, the step of measuring the mean intensity for each one of the generated SAR images comprises measuring the mean intensity of a section of the generated SAR images. It should be understood that the mean intensity for the same section of the SAR images is measured. For example, measuring only the most luminous section of the SAR images may be used for measuring the mean intensity.

FIGS. 4A-4D illustrates a graphical representation of four sub-sets of raw data resulting from a selection of sub-areas within a target area such as the selection illustrated in FIG. 3A. In this case, the sub-areas corresponding to the sub-sets of SAR raw data illustrated in FIGS. 4A-4D are contiguous and extend along the whole width of the target area in the range direction.

FIGS. 5A-5D illustrate the generated SAR images corresponding to the sub-sets of SAR raw data illustrated in FIGS. 4A-4D, respectively. The step of measuring the mean intensity of each image illustrated in FIGS. 5A-5D can comprise measuring the mean intensity of the whole image. Alternatively, only a section, such as section 84, of each image may be sensed in order to determine the mean intensity. It should be understood that the same section 84 is selected for each SAR image in order to determine the mean intensity.

Referring back to FIG. 2, the last step 58 of the method 50 comprises estimating the Doppler centroid using the mathematical function representing the relation between the measured mean intensity and the ground look number corresponding to the sub-area. The Doppler centroid can be determined from the skewness of the mathematical function. If the mathematical function representing the mean intensity is substantially symmetrical, then the Doppler centroid is substantially null. If the mathematical function representing the mean intensity is asymmetrical, then the Doppler centroid is different from zero and the value of the Doppler centroid is then determined using the skew of the mathematical function. It should be understood that any mathematical method for determining the skew of a mathematical function can be used.

In one embodiment, the Doppler centroid is determined in accordance with a database of empirical data previously stored in a memory. The empirical data contains Doppler centroid values as a function skew values.

In one embodiment, an adequate interpolation method is used for generating the mathematical function of the mean intensity.

Figure 6:
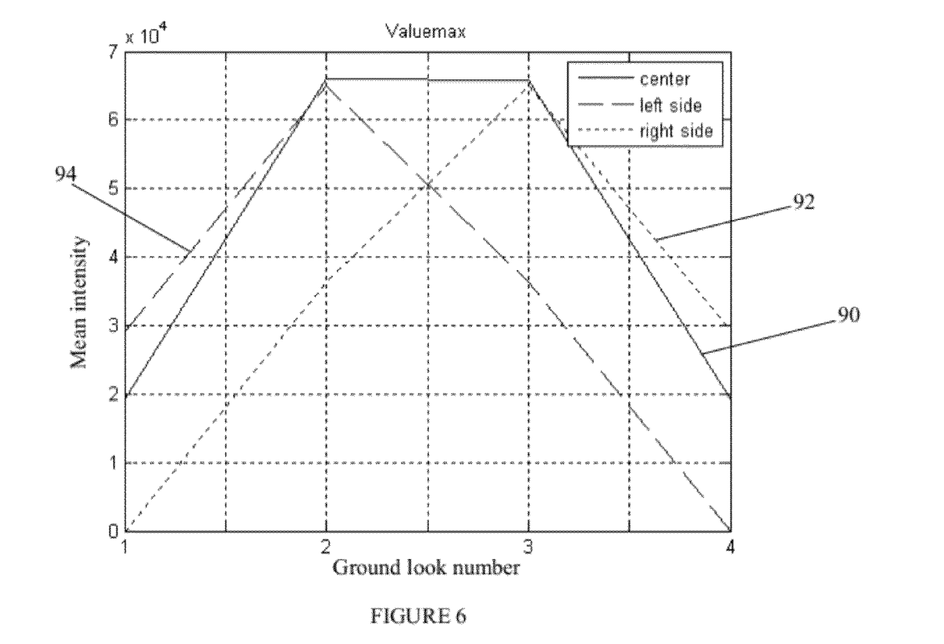
FIG. 6 illustrates three mean intensities of sub-area SAR images as a function of a ground look number.
Figure 7:
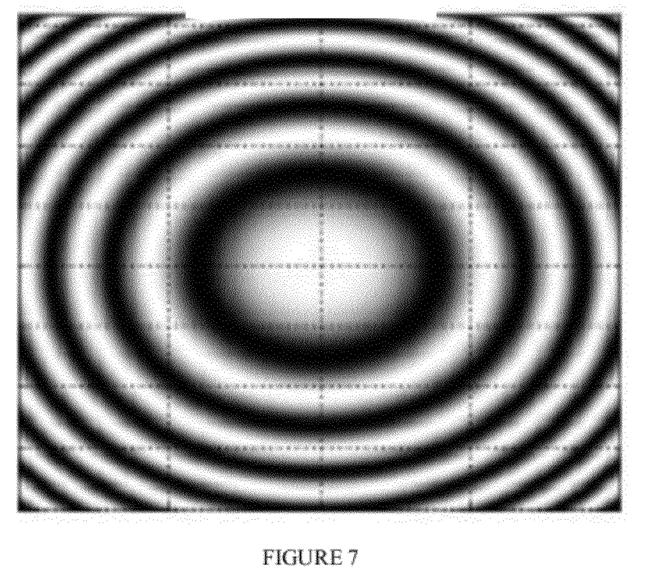
FIG. 7 illustrates a graphical representation of SAR raw data, in accordance with an embodiment.

FIG. 6 illustrates three curves 90, 92, and 94 representing the mean intensity of the generated SAR images versus the mean azimuth of the corresponding sub-areas. The curve 90 is substantially symmetrical and therefore, the Doppler centroid associated with this curve is substantially equal to zero. The curve 92 is an example of a function having a positive skew while the curve 94 is an example of a curve having a negative skew.

No additional detector is required for determining the value of the Doppler centroid using the method 50. Furthermore, no Fourier transform is required which allows a reduction of the required processing power.

In one embodiment, the method 50 further comprises the steps of determining the Doppler shift, correcting the SAR raw data in order to compensate for the Doppler shift, and generating a SAR image using the corrected SAR raw data. The Doppler shift is determined by comparing the determined Doppler centroid to a reference Doppler centroid.

In one embodiment, the correction of the SAR raw data and the generation of the SAR image is optically performed using any adequate optical methods.

In another embodiment, the correction of the SAR raw data is digitally performed and SAR raw data can be represented by a complex function. In this case, the step of correcting the SAR raw data comprises determining a phase factor in accordance with the Doppler shift induced by the SAR parameter change.

Applying the phase factor to the SAR raw data consists in multiplying the SAR raw data function ff(x, y) by an imaginary number $\exp[j\phi]$, $\phi$ being the previously determined phase factor.

$$gg(x, y) = ff(x, y)\exp[j\varphi] \quad \text{Eq. 1}$$
$$= |ff(x, y)|\exp[j\Phi\Phi(x, y)]\exp[j\varphi]$$
$$= |ff(x, y)|\exp[j(\Phi\Phi(x, y) + \varphi)]$$

where gg(x, y), |ff(x, y)|, and $j\Phi\Phi(x, y)$ respectively represent the SAR corrected data function, the amplitude function of the SAR raw data, and the phase function of the SAR raw data.

In another embodiment, the SAR raw data is graphically represented by a SAR pattern such as the SAR pattern illustrated in FIG. 6. SAR raw data points forming the SAR pattern are organized in rows along the azimuth axis and in columns along the range axis. Each SAR raw data point is associated with an amplitude value and a phase value. In this case, the step of correcting the SAR raw data comprises determining an azimuth shift using the Doppler shift and shifting the columns of SAR raw data points in accordance with the determined azimuth shift. It should be understood that applying a linear phase vector to the complex function representing the SAR raw data is equivalent to applying an azimuth shift to a SAR pattern representing the SAR raw data.

In one embodiment, the column shift and/or the phase factor are determined using a database of empirical data. The database contains values for the column shift and/or the phase factor as a function of Doppler shift values.

In one embodiment, the step of generating the SAR image using the corrected data comprises digitally generating the SAR image using the corrected digital data. Any adequate digital method for generating a SAR image using the corrected data can be used. Examples of adequate digital methods comprise the range/Doppler method, the wavenumber method, the chirp-scaling method, the plane-wave approximation method, and the like.

In another embodiment, the step of generating the SAR image using the corrected data comprises optically generating the SAR image using the corrected digital data. Any adequate optical methods for generating a SAR image using the corrected SAR data can be used. The SAR image is generated by creating an optical image of the SAR raw data and optically processing the image of the SAR raw data.

Figure 8:
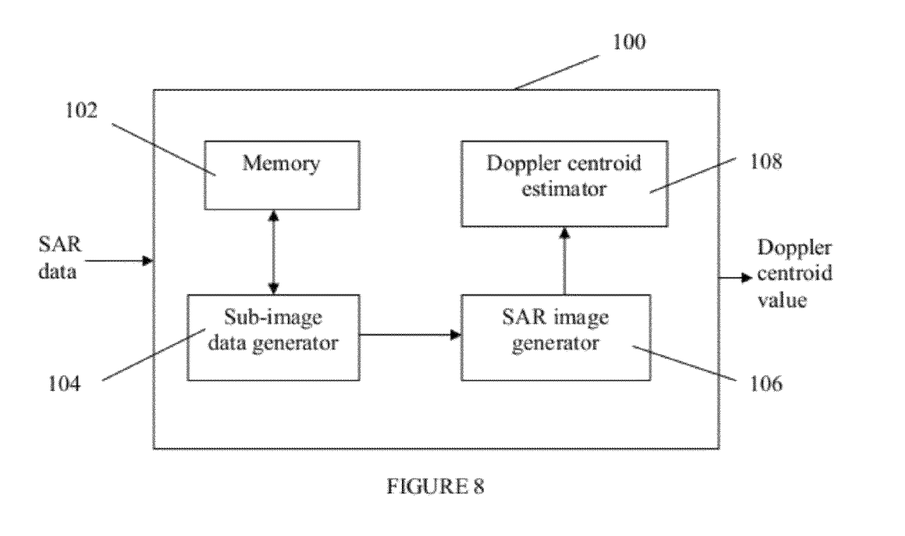
FIG. 8 is a block diagram of a Doppler centroid determining apparatus, in accordance with an embodiment.

FIG. 8 illustrates one embodiment of a system 100 for determining the Doppler centroid in SAR raw data. The system 100 comprises a memory 102, a sub-image data generator 104, a SAR image generator 106, and a Doppler centroid estimator 108. The system 100 is adapted to receive SAR raw data representative of echoes reflected by a target area. The SAR raw data is stored in the memory 102. The sub-image data generator 104 is adapted to generate at least two sub-sets of SAR raw data in accordance with the methods illustrated above. The sub-image data generator 104 accesses the SAR raw data from the memory and generates at least two sub-sets of SAR raw data each corresponding to a sub-area of the target area. The sub-areas are aligned along an azimuth axis. The sub-sets of SAR raw data are transmitted to the SAR image generator 106. Alternatively, the sub-sets of SAR raw data are stored in the memory 102. For each sub-set of SAR raw data, the SAR image generator 106 generates a SAR image. The SAR image generator 106 is further adapted to measure the mean intensity of at least a section of each generated SAR image. The measured mean intensities are transmitted to the Doppler centroid estimator 108 which is adapted to determine the skew of the function representing the mean intensity versus the ground look number of the sub-area and the Doppler centroid from the skew in accordance with the method described above.

In one embodiment, the SAR image generator 106 is a digital generator comprising a processing unit configured to digitally generate a SAR image using the digital methods described above. The processing unit is further configured to measure the mean intensity of at least a section of each generated image.

In another embodiment, the SAR image generator 106 comprises a coherent light source, a pixel drive unit, a light modulator such as an SLM or a micro display, and an optical processor. Any adequate light modulator can be used. For example, the light modulator can be a liquid crystal display, a micro mirror SLM, an electro-optic SLM, a magneto-optic SLM, or the like. The pixel drive unit is adapted to control the transmittance of each addressable pixel of the light modulator. For each one of the sub-sets of SAR raw data, the SAR image generator 106 receives the sub-set of SAR raw data and the pixel drive unit sets the transmittance of the addressable pixels of the light modulator in accordance with the sub-set of SAR raw data. The coherent light source emits a coherent light beam which illuminates the light modulator. The coherent light incident to the light modulator is modulated in accordance with the transmittance of the pixels and a modulated light corresponding to an image of the sub-set of SAR data is transmitted at the output of the light modulator. The modulated light then propagates through the optical processor which generates a reconstructed image of the sub-area. At the output of the optical processor, the reconstructed image of the sub-area is detected by the light detector which measures the mean intensity of at least a section of the reconstructed image. Alternatively, the SAR image generator can also be provided with an optical detector or sensor, such as a CCD or a CMOS sensor, for converting the optical image of the sub-area into a digital image which can be saved in memory and the mean intensity is then digitally measured.

In one embodiment, the coherent light source comprises a spatial filter to improve the quality of the image. A polarizer may be provided between the light modulator and the coherent light source if the light modulator requires polarized light.

In one embodiment, the optical processor comprises at least one cylindrical lens to selectively focus the azimuth or range field. The cylindrical lens can be used together with a spherical lens to provide focusing power in the azimuth direction. The cylindrical lens may also compensate for a chirp along the range direction and/or for a range phase factor along the azimuth direction.

In one embodiment in which the SAR image generator comprises a light detector, the optical processor can comprise at least one spherical lens for imaging the processed wave to the detector plane of the light detector.

In one embodiment, the sub-image generator 104 and the Doppler centroid estimator 108 are embodied as a single module adapted to perform the steps 54 and 58 of the method 50.

In an embodiment in which the system 100 is adapted to digitally generate SAR images, the sub-image generator 104 and the SAR image generator 106 and/or the Doppler centroid estimator 108 are embodied as a single module comprising a processing unit configured for performing the steps 54 and 56 and/or 58 of the method 50.

In one embodiment, the system 100 further comprises the SAR raw data correcting module adapted to determine the Doppler shift from the determined Doppler centroid and correct the SAR raw data in order to compensate for the Doppler shift using the method described above. The corrected raw data are then sent to the SAR image generator 106 or an additional SAR image generator, which generates an image of the corrected data.

It should be understood that the method 50 and the systems 100 can be used with interferometric SARs and non-interferometric SARs.

While the present description refers to a synthetic aperture radar, it should be understood that the methods, apparatuses, and systems described above can be applied to any synthetic aperture imaging system. For example, the method 50, and the apparatus 100 can be used with a synthetic aperture SONAR (SAS), a synthetic aperture LIDAR, a synthetic aperture terahertz system, a synthetic aperture infrared system, or the like.

It should be noted that the present invention can be carried out as a method or can be embodied in a system or an apparatus. The embodiments of the invention described above are intended to be exemplary only. The scope of the invention is therefore intended to be limited solely by the scope of the appended claims.

The invention claimed is:

1. A method for determining a Doppler centroid in a synthetic aperture imaging system, comprising:

receiving raw data representative of electromagnetic signals reflected by a target area;

selecting, among said raw data, at least two sets of sub-area data each representative of electromagnetic signals reflected by a corresponding sub-area of said target area, said sub-areas being substantially aligned along an azimuth axis of said target area and having a substantially identical surface area;

for each one of said sets of sub-area data, generating an image corresponding to said corresponding sub-area, said generating comprising:

generating an incident light;

modulating said incident light in accordance with a corresponding one of said sets of sub-area data, thereby obtaining a modulated light:

optically processing said modulated light, thereby obtaining an optical image of said corresponding sub-area:

measuring a mean intensity of said image; and     estimating said Doppler centroid from a skew of a mathematical function representing said mean intensity as a function of a look number for said corresponding sub-area.

2. The method as claimed in claim 1, wherein said measuring said mean intensity comprises optically measuring said mean intensity.

3. The method as claimed in claim 1, wherein said azimuth axis passes by a center of said target area.

4. The method as claimed in claim 1, wherein said measuring said mean intensity of said image comprises measuring a mean intensity of a section of said image.

5. The method as claimed in claim 1, wherein said receiving said raw data comprises receiving said raw data from one of a synthetic aperture radar system, a synthetic aperture lidar system, a synthetic aperture terahertz system, and a synthetic aperture infrared system.

6. A system for determining a Doppler centroid associated with synthetic aperture data, comprising:

a memory for storing raw data representative of electromagnetic signals reflected by a target area;

a sub-image data generator adapted to select, among said raw data, at least two sets of sub-area data each representative of said electromagnetic signals reflected by a corresponding sub-area of said target area, said sub-areas being substantially aligned along an azimuth axis of said target area and having a substantially identical surface area;

an image generator adapted to, for each one of said sets of sub-area data, generate an image corresponding to said corresponding sub-area and measure a mean intensity of said image, said image generator comprising:

a light source for generating incident light;

a light modulator for modulating said incident light in accordance with a corresponding one of said sets of sub-area data in order to obtain a modulated light;

an optical processor for optically processing said modulated light in order to obtain an optical image of said sub-area;

a Doppler centroid estimator adapted to calculate said Doppler centroid from a skew of a mathematical function representing said mean intensity as a function of a ground look number for said corresponding sub-area.

7. The system as claimed in claim 6, wherein said image generator comprises a light detector for optically measuring said mean intensity.

8. The system as claimed in claim 6, wherein said azimuth axis passes by a center of said target area.

9. The system as claimed in claim 6, wherein said image generator is adapted to measure a mean intensity of a section of said image.

10. The system as claimed in claim 6, wherein said raw data is generated by one of a synthetic aperture radar system, a synthetic aperture lidar system, a synthetic aperture terahertz system, and a synthetic aperture infrared system.

* * * * *